(12) United States Patent
Sasaki et al.

(10) Patent No.: US 9,570,747 B2
(45) Date of Patent: Feb. 14, 2017

(54) SECONDARY BATTERY (71) Applicant: NEC Corporation, Tokyo (JP)

(72) Inventors: Hideaki Sasaki, Tokyo (JP); Kazuhiko Inoue, Tokyo (JP); Takehiro Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 14/365,806

(22) PCT Filed: Nov. 21, 2012

(86) PCT No.: PCT/JP2012/080189
§ 371 (c)(1),
(2) Date: Jun. 16, 2014

(87) PCT Pub. No.: WO2013/088929
PCT Pub. Date: Jun. 20, 2013

(65) Prior Publication Data
US 2014/0356706 A1 Dec. 4, 2014

(30) Foreign Application Priority Data
Dec. 16, 2011 (JP) .................................. 2011-275605

(51) Int. Cl.
*H01M 4/587* (2010.01)
*H01M 4/04* (2006.01)
(Continued)

(52) U.S. Cl.
CPC ............ *H01M 4/587* (2013.01); *H01M 4/0404* (2013.01); *H01M 4/0416* (2013.01);
(Continued)

(58) Field of Classification Search
CPC .... H01M 4/133; H01M 4/1393; H01M 4/621; H01M 4/623; H01M 4/0404; H01M 4/0471; H01M 4/587
See application file for complete search history.

(56) References Cited

U.S. PATENT DOCUMENTS

| 2009/0169992 A1* | 7/2009 | Ishiko .................. H01M 6/166 429/188 |
| 2010/0159334 A1* | 6/2010 | Kashima ............... H01M 2/162 429/231.95 |

(Continued)

FOREIGN PATENT DOCUMENTS

| JP | 06-163031 | 6/1994 |
| JP | 10-188992 | 7/1998 |

(Continued)

OTHER PUBLICATIONS

International Search Report mailed Jan. 29, 2013.
(Continued)

*Primary Examiner* — Stewart Fraser
(74) *Attorney, Agent, or Firm* — Finnegan, Henderson, Farabow, Garrett & Dunner, L.L.P.

(57) ABSTRACT

There is provided a negative electrode for a secondary battery that can provide a secondary battery having high charge and discharge efficiency, and a high capacity retention rate in charge and discharge cycles. A negative electrode for a secondary battery according to this exemplary embodiment contains scale-like graphite, a fluorine-based resin, and an imide-based resin. A method for manufacturing a negative electrode for a secondary battery according to this exemplary embodiment includes applying a negative electrode slurry containing scale-like graphite, a fluorine-based resin, an imide-based resin, and a solvent for dissolving the fluorine-based resin and the imide-based resin to a negative electrode current collector; and heat-treating the negative electrode current collector at a temperature of 100° C. or more and 150° C. or less.

13 Claims, 2 Drawing Sheets (51) Int. Cl.
*H01M 4/133* (2010.01)
*H01M 4/1393* (2010.01)
*H01M 4/62* (2006.01)
*H01M 4/505* (2010.01)
*H01M 4/525* (2010.01)
*H01M 10/0525* (2010.01)

(52) U.S. Cl.
CPC ......... *H01M 4/0471* (2013.01); *H01M 4/133* (2013.01); *H01M 4/1393* (2013.01); *H01M 4/621* (2013.01); *H01M 4/623* (2013.01); *H01M 4/505* (2013.01); *H01M 4/525* (2013.01); *H01M 10/0525* (2013.01); *H01M 2220/20* (2013.01); *H01M 2220/30* (2013.01); *Y02E 60/122* (2013.01); *Y02P 70/54* (2015.11); *Y02T 10/7011* (2013.01)

(56) References Cited

U.S. PATENT DOCUMENTS

2011/0081583 A1* 4/2011 Sugimoto ............. H01M 2/145
                                                       429/346
2012/0077083 A1* 3/2012 Kageura ............... H01M 4/131
                                                       429/211
2012/0288742 A1* 11/2012 Tanaka .................. C01B 33/113
                                                       429/144

FOREIGN PATENT DOCUMENTS

| JP | 11-126600 | 5/1999 |
| JP | 11-185751 | 7/1999 |
| JP | 2000-200609 | 7/2000 |
| JP | 2002-190297 | 7/2002 |
| JP | 2003-017059 | 1/2003 |
| JP | 2004-335188 | 11/2004 |
| JP | 2007-012559 | 1/2007 |
| JP | 2009-093924 | 4/2009 |
| JP | 2010-92719 | 4/2010 |
| JP | 2010-108928 | 5/2010 |

OTHER PUBLICATIONS

Japanese Office Action mailed Aug. 16, 2016, by the Japanese Patent Office in counterpart Japanese Patent Application No. 2013-549186.

* cited by examiner

SECONDARY BATTERY

CROSS-REFERENCE TO RELATED PATENT APPLICATIONS

This application is a National Stage Entry of International Application No. PCT/JP2012/080189, filed Nov. 21, 2012, which claims priority from Japanese Patent Application No. 2011-275605, filed Dec. 16, 2011. The entire contents of the above-referenced applications are expressly incorporated herein by reference.

TECHNICAL FIELD

An exemplary embodiment according to the present invention relates to a secondary battery.

BACKGROUND ART

Lithium ion secondary batteries have small volume and high mass capacity density, and can supply high voltage, and therefore, they are widely employed as power supplies for small-sized equipment. For example, they are used as power supplies for mobile equipment, such as cellular phones and notebook computers. Further, in recent years, in addition to small-sized mobile equipment uses, applications to large size secondary batteries of which large capacity and long life are required, for electric vehicles (EV), the power storage field and the like, have been expected because of consideration for environmental problems, and an improvement in the awareness of energy saving.

As the negative electrode active material used in the negative electrode of a secondary battery, a carbon-based material is used. In addition, the binder used in an electrode of a secondary battery plays the role of bonding the electrode active material to each other and bonding the electrode active material to the electrode current collector. High adhesiveness, high resistance to the electrolytic solution, electrochemical stability, a simple manufacturing process, inexpensive cost, and the like are required of the binder. Examples of typical binders include polyvinylidene fluoride (PVDF). In addition, using as the binder imide-based resins typified by polyimides is disclosed (Patent Literatures 1 to 3).

CITATION LIST

Patent Literature

Patent Literature 1: JP06-163031A
Patent Literature 2: JP2002-190297A
Patent Literature 3: JP10-188992A

SUMMARY OF INVENTION

Technical Problem

However, further improvement is desired for the secondary batteries described in Patent Literatures 1 to 3 in terms of improving the charge and discharge efficiency and the capacity retention rate in charge and discharge cycles. It is an object of this exemplary embodiment to provide a negative electrode for a secondary battery that can provide a secondary battery having high charge and discharge efficiency, and a high capacity retention rate in charge and discharge cycles.

Solution to Problem

A negative electrode for a secondary battery according to this exemplary embodiment contains scale-like graphite, a fluorine-based resin, and an imide-based resin.

A secondary battery according to this exemplary embodiment includes the negative electrode for a secondary battery according to this exemplary embodiment.

A method for manufacturing a negative electrode for a secondary battery according to this exemplary embodiment includes applying a negative electrode slurry containing scale-like graphite, a fluorine-based resin, an imide-based resin, and a solvent for dissolving the fluorine-based resin and the imide-based resin to a negative electrode current collector; and heat-treating the negative electrode current collector at a temperature of 100° C. or more and 150° C. or less.

Advantageous Effect of Invention

According to this exemplary embodiment, it is possible to provide a negative electrode for a secondary battery that can provide a secondary battery having high charge and discharge efficiency, and a high capacity retention rate in charge and discharge cycles.

DESCRIPTION OF EMBODIMENT

Negative Electrode for Secondary Battery

A negative electrode for a secondary battery according to this exemplary embodiment contains scale-like graphite, a fluorine-based resin, and an imide-based resin.

When graphite is used as the negative electrode active material of a negative electrode for a secondary battery, graphite coated with amorphous carbon, or graphite whose particle shape has been processed into a spherical or massive form to have a small aspect ratio is usually used for the graphite, in terms of low reactivity with the electrolytic solution and low orientation of graphite particles. However, the cost of this graphite is high because it is necessary to process the particles into a spherical form or the like or coat the surface with amorphous carbon. In addition, for the graphite coated with amorphous carbon, irreversible capacity derived from the amorphous carbon occurs, and the charge and discharge efficiency of the secondary battery decreases. On the other hand, relatively inexpensive scale-like graphite is easily oriented on the negative electrode, and has high reactivity with the electrolytic solution because of high activity on the edge surface, resulting in low charge and discharge efficiency, and a low capacity retention rate in charge and discharge cycles.

In this exemplary embodiment, although scale-like graphite that has low cost but provides low charge and discharge efficiency, and a low capacity retention rate in charge and discharge cycles is used as the negative electrode active material on purpose, a negative electrode for a secondary battery that provides high charge and discharge efficiency, and a high capacity retention rate in charge and discharge cycles when used in a secondary battery can be provided by using a fluorine-based resin and an imide-based resin in combination as the binder in the negative electrode. This is considered to be because by using the fluorine-based resin and the imide-based resin as the binder of the negative electrode, the adhesiveness of the negative electrode active material layer is improved, and the reactivity between the electrolytic solution and the scale-like graphite can be reduced. For the latter effect, it is presumed that the scale-like graphite surface is coated with the imide-based resin, and thus, a type of film having lithium ion permeability such as an SEI is formed to reduce the reactivity of the scale-like graphite with the electrolytic solution.

As mentioned above, using a fluorine-based resin and an imide-based resin as the binder is described in Patent Literature 3, but an example in which the binder is used only in the positive electrode is described in Examples in Patent Literature 3. In addition, scale-like graphite is not described in Patent Literature 3. In this exemplary embodiment, a fluorine-based resin and an imide-based resin are used as the binder of the negative electrode, and scale-like carbon that provides low charge and discharge efficiency, and a low capacity retention rate in charge and discharge cycles, but has low cost is used as the negative electrode active material on purpose. Thus, it is possible to provide a negative electrode for a secondary battery that can provide a secondary battery having low cost, high charge and discharge efficiency, and a high capacity retention rate in charge and discharge cycles.

(Negative Electrode Active Material)

The negative electrode for a secondary battery according to this exemplary embodiment contains scale-like graphite as the negative electrode active material.

For graphite materials, there are natural graphite which naturally occurs and artificially manufactured synthetic graphite. These have various particle forms, such as massive graphite, scale-like graphite, and spherical graphite, depending on their method for manufacturing and way of processing. As mentioned above, in this exemplary embodiment, scale-like graphite that is inexpensive, but is easily oriented on the electrode, and has high reactivity with the electrolytic solution because of high activity on the edge surface, and provides low charge and discharge efficiency, and a low capacity retention rate in charge and discharge cycles is used as the negative electrode active material. Although the scale-like graphite is used as the negative electrode active material, the effect of improving the charge and discharge efficiency and the capacity retention rate in charge and discharge cycles is obtained by using a fluorine-based resin and an imide-based resin described later in combination as the binder in the negative electrode.

In this exemplary embodiment, the "scale-like graphite" indicates graphite particles having a flat form. The "scale-like graphite" is preferably graphite particles having a flat plate-shaped form. The shape of the "scale-like graphite" is not particularly limited as long as it has the above form. For example, the shape may be a cylindrical shape or a rectangular parallelepiped shape.

The aspect ratio of the scale-like graphite is preferably 2 or more, more preferably 4 or more. In addition, the aspect ratio is preferably 10 or less, more preferably 8 or less. The aspect ratio is represented by A/B, when the length of the graphite particle in the maximum major axis direction is taken as A and the length in the minor axis direction orthogonal to it is taken as B. In this exemplary embodiment, a cross section of a negative electrode mixture containing graphite particles and a binder is observed by an SEM, and the average value of A/B is calculated from the length of the maximum major axis (A) and the length of the minor axis (B) orthogonal at the midpoint of the maximum major axis of 10 arbitrarily selected graphite particles. The average value is taken as the aspect ratio.

The average particle diameter (D50) of the scale-like graphite in this exemplary embodiment is preferably 5 μm or more and 50 μm or less, more preferably 10 μm or more and 30 μm or less. In addition, the specific surface area of the scale-like graphite in this exemplary embodiment is preferably 0.5 $m^2/g$ or more and 5 $m^2/g$ or less, more preferably 1 $m^2/g$ or more and 3 $m^2/g$ or less. The average particle diameter (D50) of the scale-like graphite is a value measured by the laser diffraction/scattering method. In addition, the specific surface area of the scale-like graphite is a value measured and calculated by the BET method.

The proportion of the scale-like graphite to the total of the scale-like graphite included in the negative electrode for a secondary battery according to this exemplary embodiment and the binder of the negative electrode described later is preferably 85% by mass or more and 99% by mass or less, more preferably 90% by mass or more and 98% by mass or less.

(Binder)

The negative electrode for a secondary battery according to this exemplary embodiment contains a fluorine-based resin and an imide-based resin as the binder.

Polyvinylidene fluoride (PVDF) that is a fluorine-based resin is typical of the binder used in the negative electrode of a secondary battery. In addition, rubber-based binders such as styrene butadiene rubbers (SBR) can also be used. In this case, a thickening agent, such as carboxymethyl cellulose (CMC) and sodium salts thereof, is often used in combination. However, for the PVDF, the adhesiveness of the negative electrode active material layer in the electrolytic solution and the resistance to the electrolytic solution are not sufficient, and therefore, a decrease in cycle characteristics, such as a capacity retention rate, is a problem.

On the other hand, imide-based resins have high adhesiveness, high resin strength, and also high resistance to the electrolytic solution, and therefore are considered to be suitable for the binder of the negative electrode for the physical properties of the resins, and an improvement in cycle characteristics is expected. However, the practical use of the imide-based resins is difficult for the reasons, for example, that they are expensive; that they have the property of trapping lithium, and therefore, the irreversible capacity increases thereby to decrease the charge and discharge efficiency (battery capacity); and that heat treatment at 300° C. or more is necessary for the ring closure of the imide ring.

In this exemplary embodiment, a fluorine-based resin and an imide-based resin are used in combination as the binder used in the negative electrode. By using the fluorine-based resin and the imide-based resin in combination, adhesiveness and electrolytic solution resistance required of the binder of the negative electrode can be imparted while the amount of the imide-based resin used is decreased. Thus, the cycle characteristics can be improved, and a decrease in charge and discharge efficiency caused by the lithium trapping of the imide-based resin can be suppressed.

The fluorine-based resin according to this exemplary embodiment is not particularly limited, and PVDF, polytetrafluoroethylene (PTFE), or the like can be used. In addition, a polymer or a copolymer containing as a constituent unit at least one selected from the group consisting of vinylidene fluoride (VDF), tetrafluoroethylene (TFE), and hexafluoropropane (HFP) can be used. Specific examples of the PVDF include KF Polymer (trade name, manufactured by KUREHA CORPORATION). In addition, examples of the polymer or the copolymer containing as a constituent unit at least one selected from the group consisting of vinylidene fluoride (VDF), tetrafluoroethylene (TFE), and hexafluoropropane (HFP) include NEOFLON VT470 (trade name, manufactured by Daikin Industries, Ltd.) that is a VDF/TFE/HFP ternary copolymer. One of these may be used, or two or more of these may be used in combination.

The weight average molecular weight of the fluorine-based resin according to this exemplary embodiment is preferably 200000 or more and 1200000 or less, more preferably 300000 or more and 800000 or less.

The imide-based resin according to this exemplary embodiment is not particularly limited and is preferably a polyimide or a polyamideimide. Examples of the polyimide include aromatic polyimides and polyetherimides. Examples of the polyamideimide include aromatic polyamideimides. In addition, the imide-based resin according to this exemplary embodiment preferably has a hydrophilic group, such as a carboxyl group or a hydroxyl group. One of these may be used, or two or more of these may be used in combination. Particularly, as described later, the ring closure rate of the imide ring of the imide-based resin used during the preparation of a negative electrode slurry before the heat treatment step is preferably 80% or more, and the ring closure rate of the imide ring is more preferably 90% or more.

The weight average molecular weight of the imide-based resin according to this exemplary embodiment is preferably 5000 or more and 50000 or less, more preferably 10000 or more and 30000 or less.

The mass ratio of the imide-based resin (IP) to the total of the fluorine-based resin (FP) and the imide-based resin (IP) included in the negative electrode for a secondary battery according to this exemplary embodiment, (IP/(FP+IP)), is preferably 0.1 or more and 0.5 or less. When IP/(FP+IP) is 0.1 or more, the adhesive strength is sufficient, and the cycle characteristics are improved. In addition, when IP/(FP+IP) is 0.5 or less, a decrease in initial capacity due to a decrease in charge and discharge efficiency can be suppressed. IP/(FP+IP) is more preferably 0.15 or more and 0.4 or less, further preferably 0.2 or more and 0.3 or less.

The mass ratio of the fluorine-based resin (FP) to the scale-like graphite (SG) included in the negative electrode for a secondary battery according to this exemplary embodiment, (FP/SG), is preferably 0.01 or more and 0.05 or less in terms of charge and discharge efficiency and capacity retention rate improvement. FP/SG is more preferably 0.02 or more and 0.047 or less, further preferably 0.025 or more and 0.045 or less.

The mass ratio of the imide-based resin (IP) to the scale-like graphite (SG) included in the negative electrode for a secondary battery according to this exemplary embodiment, (IP/SG), is preferably 0.005 or more and 0.05 or less in terms of charge and discharge efficiency and capacity retention rate improvement. IP/SG is more preferably 0.01 or more and 0.04 or less, further preferably 0.016 or more and 0.03 or less.

The content of the fluorine-based resin and the imide-based resin as the binder included in the negative electrode for a secondary battery according to this exemplary embodiment is preferably 2% by mass or more and 10% by mass or less, more preferably 3% by mass or more and 6% by mass or less. When the content of the fluorine-based resin and the imide-based resin is 2% by mass or more, the adhesive strength is improved, and the cycle characteristics are improved. In addition, when the content of the fluorine-based resin and the imide-based resin is 10% by mass or less, a decrease in battery capacity and an increase in electrode resistance can be suppressed.

(Method for Manufacturing Negative Electrode for Secondary Battery)

A method for manufacturing a negative electrode for a secondary battery according to this exemplary embodiment includes applying a negative electrode slurry containing scale-like graphite, a fluorine-based resin, an imide-based resin, and a solvent for dissolving the above fluorine-based resin and the above imide-based resin to a negative electrode current collector; and heat-treating the above negative electrode current collector at a temperature of 100° C. or more and 150° C. or less.

The negative electrode slurry according to this exemplary embodiment contains scale-like graphite, a fluorine-based resin, an imide-based resin, and a solvent for dissolving the above fluorine-based resin and the above imide-based resin. In the imide-based resin included in the negative electrode slurry, the ring closure rate of the imide ring is preferably 80% or more, and the ring closure rate of the imide ring is more preferably 90% or more. By using the imide-based resin in which the ring closure rate of the imide ring is 80% or more, heat treatment at a high temperature of 300° C. or more is not necessary in the heat treatment step described later, and therefore, a fluorine-based resin having a heat resistance of 150° C. or less can be used in combination. In addition, the adhesive strength is improved, and a decrease in cycle characteristics due to the presence of the unreacted precursor can be suppressed. Specific examples of the imide-based resin in which the ring closure rate of the imide ring is 80% or more include VYLOMAX (trade name, manufactured by Toyobo Co., Ltd.) that is a polyamideimide, RIKACOAT (trade name, manufactured by New Japan Chemical Co., Ltd.) that is a polyimide, and SOXR (trade name, manufactured by NIPPON KODOSHI CORPORATION) for commercial products. These are soluble in N-methylpyrrolidone (NMP).

The ring closure rate of the imide ring of the imide-based resin can be measured by FT-IR. In other words, 604 $cm^{-1}$ (an absorption spectrum derived from the imide group) and 880 $cm^{-1}$ (an absorption spectrum derived from the vibration of the benzene ring) in the IR spectrum are used. The imide ring closure rate of a test subject is obtained by the following formula: the imide ring closure rate of the test subject (%)=($\alpha/\alpha'$)×100, wherein the absorbance ratio of the test subject is taken as $\alpha$, and the absorbance ratio of one with 100% of ring closure is taken as $\alpha'$, provided that $\alpha$=the absorbance (604 $cm^{-1}$) of the test subject/the absorbance (880 $cm^{-1}$) of the test subject and $\alpha'$=the absorbance (604 $cm^{-1}$) of the one with 100% of ring closure/the absorbance (880 $cm^{-1}$) of the one with 100% of ring closure hold.

Examples of the solvent for dissolving the fluorine-based resin and the imide-based resin include NMP, N-ethyl-2-pyrrolidone (NEP), N,N-dimethylformamide, N,N-dimethylacetamide, N,N-dimethylpropionamide, methyl ethyl ketone, γ-butyrolactone, and xylene though depending on the types of the fluorine-based resin and the imide-based resin. One of these may be used, or two or more of these may be used in combination.

The negative electrode slurry can contain a conductive aid in addition to the scale-like graphite, the fluorine-based resin, the imide-based resin, and the above solvent. As the conductive aid used in the negative electrode slurry, carbon black, carbon fibers, and the like can be used.

As the negative electrode current collector, copper, stainless steel, nickel, titanium, or alloys thereof, or the like can be used.

By applying the negative electrode slurry to the negative electrode current collector, a coating film of the negative electrode slurry is formed on the negative electrode current collector. The method for applying the negative electrode slurry to the negative electrode current collector is not particularly limited. The coating film of the negative electrode slurry may be formed only on one surface of the negative electrode current collector or may be formed on both surfaces.

Then, in order to remove the solvent in the coating film formed on the negative electrode current collector, heat treatment is performed at a temperature of 100° C. or more and 150° C. or less. By performing heat treatment at a temperature of 100° C. or more, heat treatment is sufficiently provided. In addition, by performing heat treatment at a temperature of 150° C. or less, a fluorine-based resin having a heat resistance of 150° C. or less can be used in combination. A negative electrode active material layer is formed on the negative electrode current collector by the heat treatment step. In order to adjust the density of the negative electrode active material layer, the negative electrode active material layer may be appropriately compressed by a method such as roll pressing.

Secondary Battery

A secondary battery according to this exemplary embodiment includes the negative electrode for a secondary battery according to this exemplary embodiment.

Figure 1:
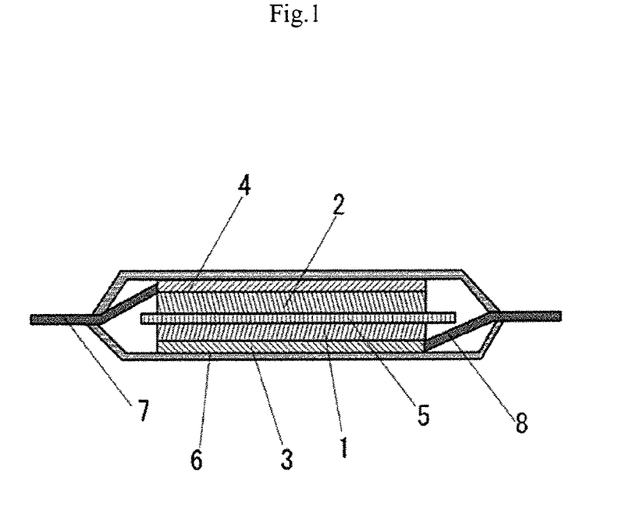
FIG. 1 is a cross-sectional view showing one example of a secondary battery according to this exemplary embodiment.

The configuration of the secondary battery according to this exemplary embodiment is not particularly limited as long as it includes the negative electrode for a secondary battery according to this exemplary embodiment. As one example of the secondary battery according to this exemplary embodiment, a laminate type secondary battery is shown in FIG. 1. In the secondary battery shown in FIG. 1, a separator 5 is sandwiched between a positive electrode including a positive electrode active material layer 1 and a positive electrode current collector 3 and the negative electrode for a secondary battery according to this exemplary embodiment including a negative electrode active material layer 2 and a negative electrode current collector 4. The positive electrode current collector 3 is connected to a positive electrode tab 8, and the negative electrode current collector 4 is connected to a negative electrode tab 7. A laminate film 6 is used for an outer package, and the interior of the secondary battery is filled with a nonaqueous electrolytic solution. The secondary battery according to this exemplary embodiment may be a lithium secondary battery or a lithium ion secondary battery.

(Positive Electrode Active Material)

The positive electrode active material included in the positive electrode of the secondary battery according to this exemplary embodiment is not particularly limited, and lithium-containing complex oxides can be used. As the lithium-containing complex oxides, $LiM1O_2$ (M1 is at least one element selected from the group consisting of Mn, Fe, Co, and Ni, and part of M1 may be replaced by Mg, Al, or Ti), $LiMn_{2-x}M2_xO_4$ (M2 is at least one element selected from the group consisting of Mg, Al, Co, Ni, Fe, and B, and $0 \leq x < 2$ holds), and the like can be used. In addition, an olivine type material represented by $LiFePO_4$ can also be used. These may be nonstoichiometric compositions, for example, Li-excess compositions. In addition, one of these may be used, or two or more of these can also be used in combination. Among these, particularly, lithium manganate represented by the above $LiMn_{2-x}M2_xO_4$ has lower capacity than lithium cobaltate ($LiCoO_2$) and lithium nickelate ($LiNiO_2$), but has low material cost because of the production of Mn higher than that of Ni and Co, and has high thermal stability because it has a spinel structure. Therefore, the lithium manganate is preferred as a material of a positive electrode active material for large size secondary batteries for electric vehicles, power storage, and the like.

(Positive Electrode)

The positive electrode of the secondary battery according to this exemplary embodiment is not particularly limited and is obtained, for example, by forming a positive electrode active material layer on at least one surface of a positive electrode current collector. The positive electrode active material layer is not particularly limited and contains, for example, the above positive electrode active material, a binder, and a conductive aid.

Examples of the binder used in the positive electrode include fluorine-based resins, such as PVDF, and acrylic resins. One of these may be used, or two or more of these may be used in combination.

Examples of the conductive aid used in the positive electrode include carbon black and carbon fibers. One of these may be used, or two or more of these may be used in combination. Particularly, as the conductive aid used in the positive electrode, carbon black having low crystallinity is preferably used.

As the positive electrode current collector, aluminum, stainless steel, nickel, titanium, or alloys thereof, or the like can be used.

The method for manufacturing the positive electrode is not particularly limited, and, for example, the above positive electrode active material, the above binder, and the above conductive aid are dispersed and kneaded in a solvent, such as NMP, in predetermined amounts of blending, and the obtained positive electrode slurry is applied to the positive electrode current collector. The positive electrode slurry can be appropriately dried and heat-treated, and thus, a positive electrode active material layer can be formed on the positive electrode current collector. In order to adjust the density of the positive electrode active material layer, the positive electrode active material layer may be appropriately compressed by a method such as roll pressing.

(Nonaqueous Electrolytic Solution)

The nonaqueous electrolytic solution is not particularly limited, and, for example, a solution in which a lithium salt is dissolved in a nonaqueous solvent can be used.

Examples of the lithium salt include $LiPF_6$, lithium imide salts, $LiAsF_6$, $LiAlCl_4$, $LiClO_4$, $LiBF_4$, and $LiSbF_6$. Examples of the lithium imide salts include $LiN(C_kF_{2k+1}SO_2)(C_mF_{2m+1}SO_2)$ (k and m are each independently 1 or 2). One of these may be used, or two or more of these may be used in combination.

As the nonaqueous solvent, at least one solvent selected from the group consisting of cyclic carbonates, chain carbonates, aliphatic carboxylates, γ-lactones, cyclic ethers, and chain ethers can be used. Examples of the cyclic carbonates include propylene carbonate (PC), ethylene carbonate (EC), butylene carbonate (BC), and derivatives thereof (including fluorinated products). Examples of the chain carbonates include dimethyl carbonate (DMC), diethyl carbonate (DEC), ethyl methyl carbonate (EMC), dipropyl carbonate (DPC), and derivatives thereof (including fluorinated products). Examples of the aliphatic carboxylates include methyl formate, methyl acetate, ethyl propionate, and derivatives thereof (including fluorinated products). Examples of the γ-lactones include γ-butyrolactone and derivatives thereof (including fluorinated products). Examples of the cyclic ethers include tetrahydrofuran, 2-methyltetrahydrofuran, and derivatives thereof (including fluorinated products). Examples of the chain ethers include 1,2-diethoxyethane (DEE), ethoxymethoxyethane (EME), ethyl ether, diethyl ether, and derivatives thereof (including fluorinated products). As the nonaqueous solvent, in addition to these, dimethyl sulfoxide, 1,3-dioxolane, formamide, acetamide, dimethylformamide, dioxolane, acetonitrile, propionitrile, nitromethane, ethyl monoglyme, phosphate triester, trimethoxymethane, dioxolane derivatives, sulfolane, methylsulfolane, 1,3-dimethyl-2-imidazolidinone, 3-methyl-2-oxazolidinone, 1,3-propane sultone, anisole, N-methylpyrrolidone, and derivatives thereof (including fluorinated products) can also be used. One of these may be used, or two or more of these may be used in combination.

The concentration of the lithium salt in the nonaqueous electrolytic solution is preferably 0.7 mol/L or more and 1.5 mol/L or less. By setting the concentration of the lithium salt to 0.7 mol/L or more, sufficient ion conductivity is obtained. In addition, by setting the concentration of the lithium salt to 1.5 mol/L or less, the viscosity can be decreased, and the movement of lithium ions is not hindered.

In addition, the nonaqueous electrolytic solution may contain an additive in order to form a good quality SEI (Solid Electrolyte Interface) film on the negative electrode surface. The SEI film serves to suppress the reactivity with the electrolytic solution and make the desolvation reaction accompanying the insertion and desorption of lithium ions smooth to prevent a deterioration in the structure of the negative electrode active material. Examples of such an additive include propane sultone, vinylene carbonate, and cyclic disulfonates. One of these may be used, or two or more of these may be used in combination.

The concentration of the additive in the nonaqueous electrolytic solution is preferably 0.2% by mass or more and 5% by mass or less. When the concentration of the additive is 0.2% by mass or more, a sufficient SEI film is formed. In addition, when the concentration of the additive is 5% by mass or less, the resistance can be decreased.

(Positive Electrode Tab and Negative Electrode Tab)

The positive electrode tab and the negative electrode tab are not particularly limited, and, for example, at least one selected from the group consisting of Al, Cu, phosphor bronze, Ni, Ti, Fe, brass, and stainless can be used as the material.

(Separator)

The separator is not particularly limited, and porous films containing polyolefins, such as polypropylene and polyethylene, fluorine-based resins, or the like can be used. In addition, cellulose and inorganic separators, such as glass separators, can also be used.

(Outer Package)

The outer package is not particularly limited, and cans, such as a coin type, a square type, and a cylindrical type cans, and laminate outer packages can be used. Among these, a laminate outer package that is a flexible film including a laminate of a synthetic resin and metal foil is preferred in terms of enabling weight reduction and promoting an improvement in the energy density of the secondary battery. A laminate type secondary battery including a laminate outer package is also excellent in heat dissipation properties and therefore preferred as a vehicle-mounted battery for electric vehicles and the like.

(Method for Manufacturing Secondary Battery)

The method for manufacturing a secondary battery according to this exemplary embodiment is not particularly limited, and examples of the method include the method shown below. The positive electrode tab and the negative electrode tab are connected to the above positive electrode and the negative electrode for a secondary battery according to this exemplary embodiment via the positive electrode current collector and the negative electrode current collector, respectively. An electrode laminate in which the above positive electrode and the above negative electrode are disposed opposed to each other with the above separator sandwiched therebetween, and laminated is fabricated. The electrode laminate is housed in the outer package and immersed in the electrolytic solution. The outer package was sealed so as to protrude parts of the positive electrode tab and the negative electrode tab outward, to fabricate a secondary battery.

EXAMPLES

Examples in this exemplary embodiment will be described in detail below, but this exemplary embodiment is not limited to the following Examples.

Example 1

Fabrication of Negative Electrode

As scale-like graphite (SG) that was a negative electrode active material, a scale-like synthetic graphite powder (average particle diameter (D50): 13 µm, specific surface area: 2.0 m$^2$/g, aspect ratio: 4.3) was provided. As a binder, a VDF/TFE/HFP ternary copolymer (trade name: NEOFLON VT470, manufactured by Daikin Industries, Ltd.) that was a fluorine-based resin (FP) was provided. In addition, as the binder, a polyamideimide (trade name: VYLOMAX HR11NN, manufactured by Toyobo Co., Ltd.) that was an imide-based resin (IP) was provided. The ring closure rate of the polyamideimide is 100%. The scale-like graphite (SG), the fluorine-based resin (FP), and the imide-based resin (IP) were uniformly dispersed in NMP so that the mass ratio of the each solids satisfies SG:FP:IP=95.0:2.5:2.5, to prepare a negative electrode slurry. The negative electrode slurry was applied to 15 µm thick copper foil that was a negative electrode current collector. Then, the negative electrode slurry was dried at 125° C. for 10 minutes to evaporate the NMP to form a negative electrode active material layer. The negative electrode active material layer was pressed to fabricate a negative electrode. The mass of the negative electrode active material layer per unit area after the drying was 0.008 g/cm$^2$.

(Fabrication of Positive Electrode)

As a positive electrode active material, a LiMn$_2$O$_4$ powder (average particle diameter (D50): 15 µm, specific surface area: 0.5 m$^2$/g) was provided. The positive electrode active material, PVDF as a binder, and carbon black as a conductive aid were uniformly dispersed in NMP at a mass ratio of 91:4:5 to prepare a positive electrode slurry. The positive electrode slurry was applied to 20 µm thick aluminum foil that was a positive electrode current collector. Then, the positive electrode slurry was dried at 125° C. for 10 minutes to evaporate the NMP to form a positive electrode active material layer to provide a positive electrode. The mass of the positive electrode active material layer per unit area after the drying was 0.024 g/cm$^2$.

(Nonaqueous Electrolytic Solution)

A nonaqueous electrolytic solution in which $LiPF_6$ as an electrolyte was dissolved at 1 mol/L in a nonaqueous solvent in which EC and DEC were mixed at a ratio of EC:DEC=30:70 (% by volume) was prepared. To this nonaqueous electrolytic solution, 1.5% by mass of vinylene carbonate as an additive was added.

(Fabrication of Secondary Battery)

Each of the fabricated positive electrode and negative electrode was cut into 5 cm×6 cm. In this, one side of 5 cm×1 cm was a portion where the electrode active material layer was not formed in order to connect a tab (uncoated portion), and a portion where the electrode active material layer was formed was 5 cm×5 cm. A aluminum positive electrode tab having dimensions of 5 mm wide×3 cm long×0.1 mm thick was ultrasonically welded to the uncoated portion of the positive electrode with a length of 1 cm. A nickel negative electrode tab having the same size as the positive electrode tab was ultrasonically welded to the uncoated portion of the negative electrode. The negative electrode and the positive electrode were disposed on both surfaces of a separator containing polyethylene and polypropylene and having a size of 6 cm×6 cm so that the electrode active material layers overlap each other through the separator, to obtain an electrode laminate. Three sides excluding one of the long sides of two aluminum laminate films having a size of 7 cm×10 cm were adhered within a width of 5 mm by heat sealing to fabricate a bag-shaped laminate outer package. The above electrode laminate was inserted into the bag-shaped laminate outer package at a distance of 1 cm from one short side of the laminate outer package. Further, 0.2 g of the above nonaqueous electrolytic solution was injected for vacuum impregnation, and then, the opening was sealed within a width of 5 mm by heat sealing under reduced pressure. Thus, a laminate type secondary battery was fabricated.

(Initial Charge and Discharge)

The fabricated secondary battery was subjected to initial charge and discharge. First, the secondary battery was charged at 20° C. at a constant current of 10 mA corresponding to a 5 hour rate (0.2 C) to 4.2 V. Then, the secondary battery was subjected to 4.2 V constant voltage charge for 8 hours in total. Then, the secondary battery was subjected to constant current discharge at 10 mA to 3.0 V. The ratio of initial discharge capacity to initial charge capacity ((initial discharge capacity/initial charge capacity)×100(%)) was calculated as charge and discharge efficiency (%). The result is shown in Table 1.

(Cycle Test)

The secondary battery subjected to the above initial charge and discharge was charged at 1 C (50 mA) to 4.2 V. Then, the secondary battery was subjected to 4.2 V constant voltage charge for 2.5 hours in total. Then, the secondary battery was subjected to constant current discharge at 1 C to 3.0 V. This charge and discharge cycle was repeated 500 times at 45° C. The ratio of discharge capacity after 500 cycles to initial discharge capacity was calculated as a capacity retention rate (%). The result is shown in Table 1.

Example 2

A secondary battery was fabricated and evaluated by the same methods as Example 1 except that in the preparation of a negative electrode slurry, the mass ratio of SG, FP, and IP satisfies SG:FP:IP=95.0:3.5:1.5. The results are shown in Table 1.

Example 3

A secondary battery was fabricated and evaluated by the same methods as Example 1 except that in the preparation of a negative electrode slurry, the mass ratio of SG, FP, and IP satisfies SG:FP:IP=95.0:4.0:1.0. The results are shown in Table 1.

Example 4

A secondary battery was fabricated and evaluated by the same methods as Example 1 except that in the preparation of a negative electrode slurry, the mass ratio of SG, FP, and IP satisfies SG:FP:IP=95.0:4.5:0.5. The results are shown in Table 1.

Comparative Example 1

A secondary battery was fabricated and evaluated by the same methods as Example 1 except that in the preparation of a negative electrode slurry, the imide-based resin (IP) was not added, and that the mass ratio of SG and FP satisfies SG:FP=95.0:5.0. The results are shown in Table 1.

Comparative Example 2

A secondary battery was fabricated and evaluated by the same methods as Example 1 except that in the preparation of a negative electrode slurry, the fluorine-based resin (FP) was not added, and that the mass ratio of SG and IP satisfies SG:IP=95.0:5.0. The results are shown in Table 1.

Comparative Example 3

A secondary battery was fabricated and evaluated by the same methods as Comparative Example 2 except that in the fabrication of a negative electrode, after drying at 125° C. for 10 minutes, heat treatment was performed in a nitrogen gas flow at 250° C. for 10 minutes. The results are shown in Table 1.

Comparative Example 4

A secondary battery was fabricated and evaluated by the same methods as Comparative Example 2 except that in the preparation of a negative electrode slurry, a solution of a polyamic acid (trade name: U-Varnish A, manufactured by Ube Industries, Ltd., ring closure rate of imide ring: 0%) that was a polyimide precursor was used as the imide-based resin (IP). The results are shown in Table 1.

Comparative Example 5

A secondary battery was fabricated and evaluated by the same methods as Comparative Example 4 except that in the fabrication of a negative electrode, after drying at 125° C. for 10 minutes, heat treatment was performed in a nitrogen gas flow at 300° C. for 10 minutes. The results are shown in Table 1.

Comparative Example 6

A secondary battery was fabricated and evaluated by the same methods as Example 1 except that in the preparation of a negative electrode slurry, the fluorine-based resin (FP) was not added, and that the mass ratio of SG and IP satisfies SG:IP=98.5:1.5. But, in Comparative Example 6, the negative electrode active material layer peeled from the current collector, and therefore, the above evaluation could not be performed.

Comparative Example 7

A secondary battery was fabricated and evaluated by the same methods as Comparative Example 1 except that in the preparation of a negative electrode slurry, spherical graphite (natural graphite, average particle diameter (D50): 20 μm, specific surface area: 0.8 m²/g, a carbon coating was present on the surface) was used instead of the scale-like synthetic graphite powder. The results are shown in Table 1.

Comparative Example 8

A secondary battery was fabricated and evaluated by the same methods as Example 3 except that in the preparation of a negative electrode slurry, spherical graphite (natural graphite, average particle diameter (D50): 20 μm, specific surface area: 0.8 m²/g, a carbon coating was present on the surface) was used instead of the scale-like synthetic graphite powder. The results are shown in Table 1.

Comparative Example 9

A secondary battery was fabricated and evaluated by the same methods as Example 1 except that in the preparation of a negative electrode slurry, spherical graphite (natural graphite, average particle diameter (D50): 20 μm, specific surface area: 0.8 m²/g, a carbon coating was present on the surface) was used instead of the scale-like synthetic graphite powder. The results are shown in Table 1.

Comparative Example 10

A secondary battery was fabricated and evaluated by the same methods as Comparative Example 2 except that in the preparation of a negative electrode slurry, spherical graphite (natural graphite, average particle diameter (D50): 20 μm, specific surface area: 0.8 m²/g, a carbon coating was present on the surface) was used instead of the scale-like synthetic graphite powder. The results are shown in Table 1.

Comparative Example 11

A secondary battery was fabricated and evaluated by the same methods as Comparative Example 1 except that in the preparation of a positive electrode slurry, as the binder, instead of the PVDF, the fluorine-based resin (FP) and the imide-based resin (IP) were used at FP:IP=3.2:0.8 in terms of a mass ratio. The results are shown in Table 1.

Comparative Example 12

A secondary battery was fabricated and evaluated by the same methods as Comparative Example 1 except that in the preparation of a positive electrode slurry, as the binder, instead of the PVDF, the fluorine-based resin (FP) and the imide-based resin (IP) were used at FP:IP=2.0:2.0 in terms of a mass ratio. The results are shown in Table 1.

TABLE 1

| | Negative electrode | | | | | | |
|---|---|---|---|---|---|---|---|
| | Negative electrode active material | FP | IP | SG (%) | FP (%) | IP (%) | IP/(FP + IP) |
| Example 1 | Scale-like graphite (SG) | VDF/TFE/HFP | Polyamideimide | 95.0 | 2.5 | 2.5 | 0.5 |
| Example 2 | Scale-like graphite (SG) | VDF/TFE/HFP | Polyamideimide | 95.0 | 3.5 | 1.5 | 0.3 |
| Example 3 | Scale-like graphite (SG) | VDF/TFE/HFP | Polyamideimide | 95.0 | 4.0 | 1.0 | 0.2 |
| Example 4 | Scale-like graphite (SG) | VDF/TFE/HFP | Polyamideimide | 95.0 | 4.5 | 0.5 | 0.1 |
| Comparative Example 1 | Scale-like graphite (SG) | VDF/TFE/HFP | Polyamideimide | 95.0 | 5.0 | 0.0 | 0.0 |
| Comparative Example 2 | Scale-like graphite (SG) | VDF/TFE/HFP | Polyamideimide | 95.0 | 0.0 | 5.0 | 1.0 |
| Comparative Example 3 | Scale-like graphite (SG) | VDF/TFE/HFP | Polyamideimide | 95.0 | 0.0 | 5.0 | 1.0 |
| Comparative Example 4 | Scale-like graphite (SG) | VDF/TFE/HFP | Polyimide (polyimide precursor) | 95.0 | 0.0 | 5.0 | 1.0 |
| Comparative Example 5 | Scale-like graphite (SG) | VDF/TFE/HFP | Polyimide (polyimide precursor) | 95.0 | 0.0 | 5.0 | 1.0 |
| Comparative Example 6 | Scale-like graphite (SG) | VDF/TFE/HFP | Polyamideimide | 98.5 | 0.0 | 1.5 | 1.0 |
| Comparative Example 7 | Spherical graphite | VDF/TFE/HFP | Polyamideimide | — | 5.0 | 0.0 | 0.0 |
| Comparative Example 8 | Spherical graphite | VDF/TFE/HFP | Polyamideimide | — | 4.0 | 1.0 | 0.2 |
| Comparative Example 9 | Spherical graphite | VDF/TFE/HFP | Polyamideimide | — | 2.5 | 2.5 | 0.5 |
| Comparative Example 10 | Spherical graphite | VDF/TFE/HFP | Polyamideimide | — | 0.0 | 5.0 | 1.0 |
| Comparative Example 11 | Scale-like graphite (SG) | VDF/TFE/HFP | Polyamideimide | 95.0 | 5.0 | 0.0 | 0.0 |
| Comparative Example 12 | Scale-like graphite (SG) | VDF/TFE/HFP | Polyamideimide | 95.0 | 5.0 | 0.0 | 0.0 |

| | Negative electrode | | | Positive | Charge and | Capacity |
|---|---|---|---|---|---|---|
| | FP/SG | IP/SG | Heat treatment (° C.) | electrode Binder | discharge efficiency (%) | retention rate (%) |
| Example 1 | 0.026 | 0.026 | 125 | PVDF | 84.3 | 72 |
| Example 2 | 0.037 | 0.016 | 125 | PVDF | 86.4 | 73 |

TABLE 1-continued

| | | | | | | |
|---|---|---|---|---|---|---|
| Example 3 | 0.042 | 0.011 | 125 | PVDF | 87.7 | 74 |
| Example 4 | 0.047 | 0.0053 | 125 | PVDF | 86.7 | 66 |
| Comparative Example 1 | 0.053 | 0.00 | 125 | PVDF | 86.2 | 48 |
| Comparative Example 2 | 0.00 | 0.053 | 125 | PVDF | 80.6 | 66 |
| Comparative Example 3 | 0.00 | 0.053 | 250 | PVDF | 79.5 | 64 |
| Comparative Example 4 | 0.00 | 0.053 | 125 | PVDF | 73.9 | 49 |
| Comparative Example 5 | 0.00 | 0.053 | 300 | PVDF | 75.5 | 68 |
| Comparative Example 6 | 0.00 | 0.015 | 125 | PVDF | — | — |
| Comparative Example 7 | — | — | 125 | PVDF | 81.9 | 71 |
| Comparative Example 8 | — | — | 125 | PVDF | 79.7 | 65 |
| Comparative Example 9 | — | — | 125 | PVDF | 77.9 | 62 |
| Comparative Example 10 | — | — | 125 | PVDF | 74.5 | 66 |
| Comparative Example 11 | 0.053 | 0.00 | 125 | FP/IP = 3.2/0.8 | 85.4 | 47 |
| Comparative Example 12 | 0.053 | 0.00 | 125 | FP/IP = 2.0/2.0 | 85.1 | 44 |

As shown in Table 1, in Comparative Example 1 in which only the fluorine-based resin (FP) was used as the binder of the negative electrode, the charge and discharge efficiency was sufficient, but the capacity retention rate was low. In addition, in Comparative Example 2 in which only the imide-based resin (IP) was used as the binder of the negative electrode, the capacity retention rate was higher than in Comparative Example 1, but the charge and discharge efficiency was lower than in Comparative Example 1. On the other hand, in all of Examples 1 to 4 in which the fluorine-based resin (FP) and the imide-based resin (IP) were used in combination as the binder of the negative electrode, a capacity retention rate equal to or higher than those in Comparative Examples 1 and 2 was shown. In addition, the charge and discharge efficiency was also higher in all of Examples 1 to 4 than in Comparative Example 2, and a value higher than that in Comparative Example 1 was shown for Examples 2 to 4. From the above results, it was confirmed that the charge and discharge efficiency and the capacity retention rate were improved by using the fluorine-based resin (FP) and the imide-based resin (IP) in combination as the binder of the negative electrode for the scale-like graphite (SG) as the negative electrode active material.

In addition, the tendency of the charge and discharge efficiency to decrease when the ratio of the imide-based resin (IP) was high with respect to the fluorine-based resin (FP) was seen from Table 1, and therefore, it was presumed that irreversible capacity occurred due to the fact that the imide-based resin (IP) itself trapped lithium.

In Comparative Examples 2 and 3, the influence of heat treatment at high temperature when the imide-based resin (IP) which has the high ring closure rate of the imide ring was used was studied. In Comparative Examples 2 and 3, no large difference was seen in both the charge and discharge efficiency and the capacity retention rate whether heat treatment at 250° C. was performed or not. On the other hand, in Comparative Examples 4 and 5, the influence of heat treatment at high temperature when a polyamic acid that was a polyimide precursor in which the imide ring was not closed was used was examined. In Comparative Example 4, the capacity retention rate decreased significantly with respect to Comparative Example 5, and therefore, it was confirmed that in this case, it was necessary to perform heat treatment at 300° C. The heat treatment temperature of the fluorine-based resin (FP) is limited to 150° C. or less because of its heat resistance, and therefore, when the fluorine-based resin (FP) and a precursor in which the imide ring is not closed are used in combination, the cycle characteristics decrease. Therefore, in this exemplary embodiment, the imide-based resin (IP) which has the high ring closure rate of the imide ring is preferably used in the preparation of a negative electrode slurry.

In Comparative Examples 7 to 10, cases where spherical graphite was used as the negative electrode active material were studied. When the spherical graphite was used, both the charge and discharge efficiency and the capacity retention rate were lower than in the Examples in which the scale-like graphite (SG) was used. In addition, even if the ratio of the fluorine-based resin (FP) to the imide-based resin (IP) was changed, no significant improvement in charge and discharge efficiency and capacity retention rate was observed. Thus, it was confirmed that the binder of the fluorine-based resin (FP) and the imide-based resin (IP) was effective for the scale-like graphite (SG).

In Comparative Examples 11 and 12, cases where the fluorine-based resin (FP) and the imide-based resin (IP) were used as the binder of the positive electrode as described in Patent Literature 3 were studied. But, the charge and discharge efficiency and the capacity retention rate were lower than in the Examples, and it was confirmed that it was effective to use these binders as the binder of the negative electrode.

(Adhesiveness of Negative Electrode Active Material Layer in Nonaqueous Electrolytic Solution)

In order to further study the effect of using the fluorine-based resin (FP) and the imide-based resin (IP) in combination as the binder of the negative electrode, the following evaluation was performed for Example 3 in which the highest charge and discharge efficiency and capacity retention rate were shown among the Examples, and Comparative Examples 1 and 2.

Only each of the negative electrodes fabricated in Example 3 and Comparative Examples 1 and 2 was placed in aluminum laminate films in which three sides were sealed, and the nonaqueous electrolytic solution was injected and one side was sealed as in Example 3 and Comparative Examples 1 and 2. This was allowed to stand at 20° C., 45° C., and 60° C. for 20 hours, and then, the negative electrode was removed, and whether the negative electrode active material layer peeled or not was visually confirmed. The results are shown in Table 2.

TABLE 2

| | 20° C. | 45° C. | 60° C. |
|---|---|---|---|
| Example 3 | No peeling | No peeling | No peeling |
| Comparative Example 1 | No peeling | Partially peeled | Completely peeled |
| Comparative Example 2 | No peeling | No peeling | No peeling |

In Comparative Example 1 in which only the fluorine-based resin (FP) was used as the binder of the negative electrode, the peeling of the negative electrode active material layer was significantly noted as the temperature increases. On the other hand, in Example 3 and Comparative Example 2, no peeling was noted even at 60° C. From this, it was confirmed that the adhesiveness of the negative electrode active material layer was improved by adding the imide-based resin (IP) to the fluorine-based resin (FP) as the binder of the negative electrode.

(Initial Charge and Discharge Curve)

A 20 mm Φ×3.2 mm coin cell was fabricated using each of the negative electrodes fabricated in Example 3 and Comparative Examples 1 and 2 (12 mm Φ), lithium metal (15 mm Φ, thickness 1.4 mm) as a counter electrode, and a separator (21 mm Φ). The same nonaqueous electrolytic solution as Example 1 was used for the nonaqueous electrolytic solution, and the negative electrode, the separator, and the lithium metal were each impregnated with the nonaqueous electrolytic solution, and then, a coin cell was assembled. The coin cell was subjected to initial charge and discharge, and an initial charge and discharge curve in which the horizontal axis was capacity per the mass of the negative electrode active material (mAh/g), and the vertical axis was voltage (mV) was measured. The initial charge conditions were set to CC-CV charge at 0.16 mA (CV time: 20 hours, lower limit voltage: 5 mV). In addition, the initial discharge conditions were set to CC discharge at 0.16 mA (upper limit voltage: 2000 mV).

Figure 2:
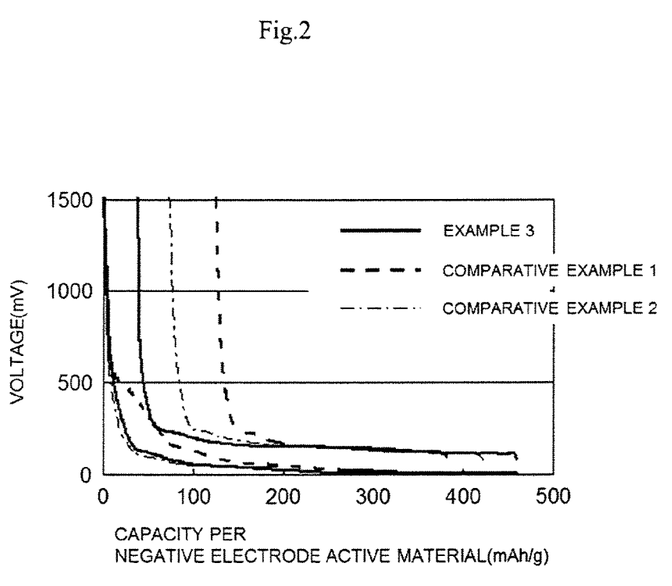
FIG. 2 is a diagram showing the results of the measurement of an initial charge and discharge curve in Example 3 and Comparative Examples 1 and 2.

The results of the measurement of the initial charge and discharge curve in Example 3 and Comparative Examples 1 and 2 are shown in FIG. 2. In Comparative Example 1 in which only the fluorine-based resin (FP) was used as the binder of the negative electrode, a shoulder presumed to be due to a reaction with the nonaqueous electrolytic solution was observed around 0.5 V during the initial charge. Therefore, it was suggested that when only the fluorine-based resin (FP) was used as the binder of the negative electrode, not only was the adhesiveness of the negative electrode active material layer low, but the reactivity with the nonaqueous electrolytic solution was high. On the other hand, in Example 3 and Comparative Example 2, the shoulder around 0.5 V was not observed, and it was confirmed that the reactivity with the nonaqueous electrolytic solution was low.

In addition, the irreversible capacity was smaller in Example 3 than in Comparative Examples 1 and 2, and therefore, it was confirmed that the charge and discharge characteristics were more improved when both the fluorine-based resin (FP) and the imide-based resin (IP) were used as the binder of the negative electrode than when each was used alone. This is presumed to be because the reaction with the nonaqueous electrolytic solution is suppressed by the addition of the imide-based resin (IP), and lithium trapping by the imide-based resin (IP) is also suppressed by controlling the amount of the imide-based resin (IP) added, and therefore, the entire irreversible capacity is reduced.

On the other hand, as described above, in Comparative Example 6, the negative electrode active material layer peeled from the negative electrode current collector, and therefore, the evaluation of the secondary battery could not be performed. It was confirmed that the amount of the imide-based resin (IP) used was significantly reduced by using not only the imide-based resin (IP) but the fluorine-based resin (FP) in combination as the binder of the negative electrode.

This application claims priority to Japanese Patent Application No. 2011-275605 filed Dec. 16, 2011, the entire disclosure of which is incorporated herein.

The invention of this application has been described with reference to the exemplary embodiment and the Examples, but the invention of this application is not limited to the above exemplary embodiment and Examples. Various changes that can be understood by those skilled in the art can be made in the configuration and details of the invention of this application within the scope of the invention of this application.

The invention claimed is:

1. A negative electrode for a secondary battery comprising scale-like graphite, a fluorine-based resin, and an imide-based resin,
   wherein the negative electrode for a secondary battery satisfies either the following items (i), (ii), or (iii);
   (i) a mass ratio of the imide-based resin (IP) to a total of the fluorine-based resin (FP) and the imide-based resin (IP), (IP/(FP+IP)), is 0.1 or more and 0.5 or less;
   (ii) a mass ratio of the fluorine-based resin (FP) to the scale-like graphite (SG), (FP/SG), is 0.01 or more and 0.05 or less;
   (iii) a mass ratio of the imide-based resin (IP) to the scale-like graphite (SG), (IP/SG), is 0.005 or more and 0.05 or less.

2. The negative electrode for a secondary battery according to claim 1, wherein the imide-based resin is a polyimide or polyamideimide.

3. The negative electrode for a secondary battery according to claim 1, wherein the fluorine-based resin is a polymer or a copolymer comprising as a constituent unit at least one selected from the group consisting of vinylidene fluoride (VDF), tetrafluoroethylene (TFE), and hexafluoropropane (HFP).

4. The negative electrode for a secondary battery according to claim 1 manufactured by
   applying a negative electrode slurry comprising the scale-like graphite, the fluorine-based resin, the imide-based resin, and a solvent for dissolving the fluorine-based resin and the imide-based resin to a negative electrode current collector, and
   heat-treating the negative electrode current collector at a temperature of 100° C. or more and 150° C. or less.

5. The negative electrode for a secondary battery according to claim 4, wherein a ring closure rate of the imide-based resin comprised in the negative electrode slurry is 80% or more.

6. The negative electrode for a secondary battery according to claim 1, wherein an aspect ratio of the scale-like graphite is 2 or more and 10 or less.

7. A secondary battery comprising the negative electrode for a secondary battery according to claim 1.

8. The secondary battery according to claim 7 comprising a positive electrode comprising $LiMn_{2-x}M2_xO_4$, wherein M2 is at least one element selected from the group consisting of Mg, Al, Co, Ni, Fe, and B, and $0 \leq x < 2$ holds.

9. A method for manufacturing a negative electrode for a secondary battery, comprising:
applying a negative electrode slurry comprising scale-like graphite, a fluorine-based resin, an imide-based resin, and a solvent for dissolving the fluorine-based resin and the imide-based resin to a negative electrode current collector; and
heat-treating the negative electrode current collector at a temperature of 100° C. or more and 150° C. or less,
wherein the negative electrode for a secondary battery satisfies either the following items (i), (ii), or (iii);
(i) a mass ratio of the imide-based resin (IP) to a total of the fluorine-based resin (FP) and the imide-based resin (IP), (IP/(FP+IP)), is 0.1 or more and 0.5 or less;
(ii) a mass ratio of the fluorine-based resin (FP) to the scale-like graphite (SG), (FP/SG), is 0.01 or more and 0.05 or less;
(iii) a mass ratio of the imide-based resin (IP) to the scale-like graphite (SG), (IP/SG), is 0.005 or more and 0.05 or less.

10. The method for manufacturing a negative electrode for a secondary battery according to claim 9, wherein a ring closure rate of the imide-based resin comprised in the negative electrode slurry is 80% or more.

11. The method for manufacturing a negative electrode for a secondary battery according to claim 9, wherein the imide-based resin is a polyimide or a polyamideimide.

12. The method for manufacturing a negative electrode for a secondary battery according to claim 9, wherein the fluorine-based resin is a polymer or a copolymer comprising as a constituent unit at least one selected from the group consisting of vinylidene fluoride (VDF), tetrafluoroethylene (TFE), and hexafluoropropane (HFP).

13. The method for manufacturing a negative electrode for a secondary battery according to claim 9, wherein an aspect ratio of the scale-like graphite is 2 or more and 10 or less.

* * * * *